Sept. 20, 1971  J. J. FULLAM  3,605,776
GAS VENT RELIEF DEVICE
Filed April 29, 1970  4 Sheets-Sheet 1
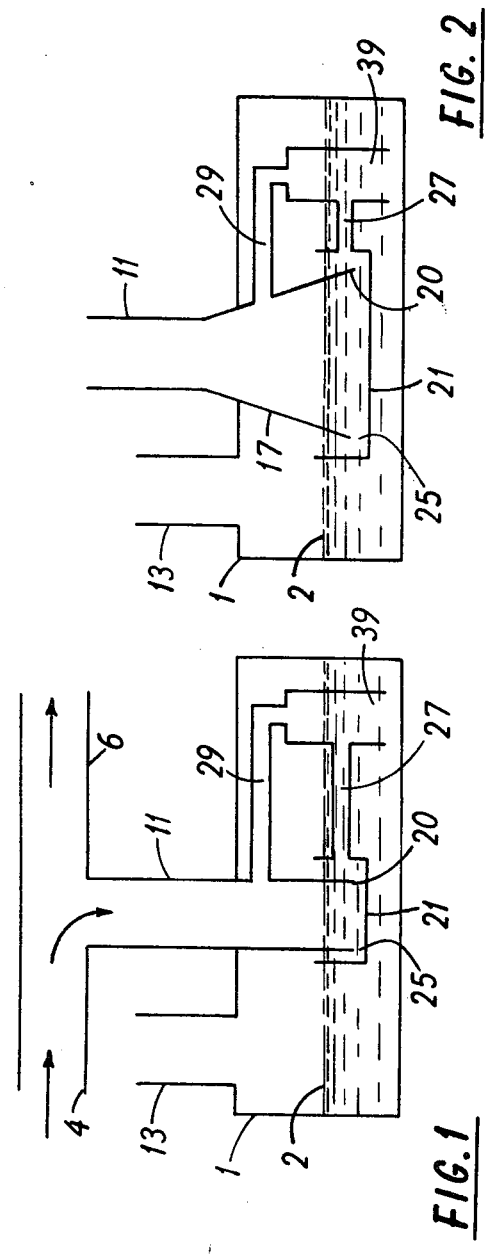
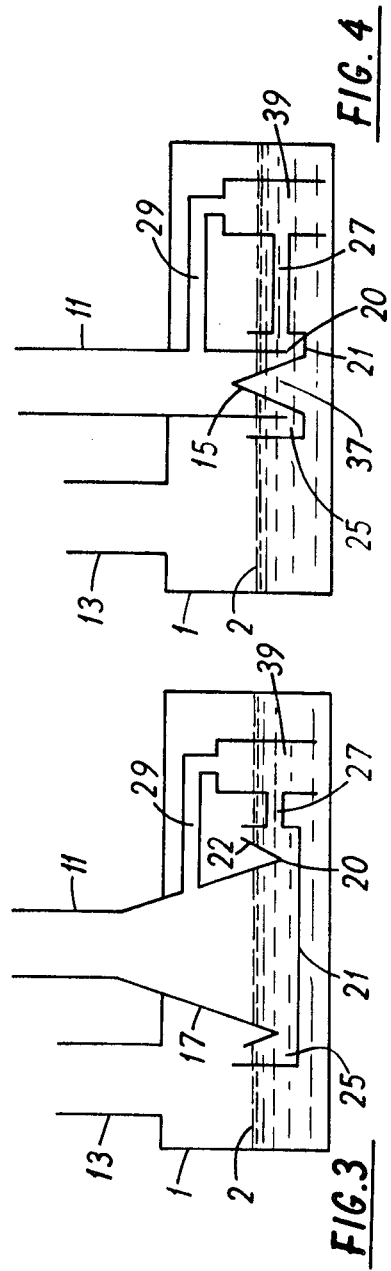
INVENTOR.
JAMES J. FULLAM
BY
*Gerard P. Rooney*
ATTORNEY

INVENTOR.
JAMES J. FULLAM

Sept. 20, 1971 J. J. FULLAM 3,605,776
GAS VENT RELIEF DEVICE
Filed April 29, 1970 4 Sheets-Sheet 3

INVENTOR.
JAMES J. FULLAM
BY
ATTORNEY

Sept. 20, 1971  J. J. FULLAM  3,605,776
GAS VENT RELIEF DEVICE

Filed April 29, 1970  4 Sheets-Sheet 4

INVENTOR.
JAMES J. FULLAM
BY
ATTORNEY

United States Patent Office 3,605,776
Patented Sept. 20, 1971

3,605,776
GAS VENT RELIEF DEVICE
James J. Fullam, Furlong, Pa., assignor to Allied
Chemical Corporation, New York, N.Y.
Filed Apr. 29, 1970, Ser. No. 33,022
Int. Cl. F16k 9/00
U.S. Cl. 137—14                                    16 Claims

ABSTRACT OF THE DISCLOSURE

A gas pressure relief device is provided which is based on a liquid seal and comprises a housing having inlet and outlet means, a liquid level within said housing which seals the open end of the inlet means under normal operating pressures, said seal capable of being blown or ruptured under abnormal pressure conditions to permit passage of gas through the inlet means into the housing and escape through the outlet means; the structure of said inlet means at its open end in the housing being designed so that the liquid seal will not reestablish itself when blown until the pressure in the inlet means has been returned to a predetermined normal operating level and will not permit reverse gas flow even when the system which the device serves is subjected to moderate negative pressure. This invention finds particular application as a safety device for control of the pressure of hydrogen gas evolved in the manufacture of chlorine in electrolytic cells.

---

This invention relates to a novel gas pressure relief device employing a liquid seal. It is particularly adapted to the smooth, rapid release of large volumes of gas under excessive gas pressure wherein the controlled venting of gas through a liquid is desired, without pulsations in pressure which is characteristic of prior art liquid sealed pressure relief devices. Also, the present device effects rapid reestablishment of the liquid seal, when the gas pressure has fallen to within its normal operating range and is designed to prevent any reverse flow of gas should a slight negative pressure develop within the system. The present device has application in chemical processing operations, particularly as a safety device for the control of the pressure of hydrogen gas produced in the manufacture of chlorine in electrolytic cells by the electrolysis of a salt brine.

In the operation of electrolytic cells, it is often the practice to collect and compress the by-product hydrogen gas for use as fuel. If failure of the compressor occurs even momentarily, or if for any reason the rate at which the hydrogen is collected, falls below the rate at which it is evolved, a back pressure of hydrogen develops. This presents a very hazardous situation where the electrolytic cells are of the diaphragm type. Such "diaphragms" usually consist of a structurally weak, felted asbestos mat which covers a hollow perforated metal cathode in the electrolytic cell. In the case of the typical diaphragm-type cell, any failure to remove the hydrogen at the rate at which it is liberated, could blow off sections of the fragile diaphragm, permitting the hydrogen to combine with chlorine. When the percentage of hydrogen in the chlorine reaches a certain value (approximately 4%), the gases will combine explosively on the slightest provocation, resulting in costly damage. Typically, a positive pressure of about 0.2 to 0.3 inch of water above atmospheric, i.e. "water gauge" (WG), would be maintained in the cell house mains, whereas a pressure of 0.75 inch (WG) or more would be excessive. It will be noted, therefore, that typically the pressures at which relief is required are comparatively low, whereas the volumes of gas to be handled are high.

In the past it has been the practice to employ relief devices, but these have shortcomings and generally do not totally eliminate the danger of explosion described. While liquid seals have been used in the past, these have not been too successful because of the bubbling of the gas through the seal and the intermittent reestablishment of the seal which causes pulsations in the gas pressure being relieved. These pulsations contribute to the disintegration of the diaphragms, the failure of which would permit hydrogen intrusion into the chlorine.

It is the object of this invention to provide a gas pressure relief device, sensitive to very small pressure differentials, which is based on a liquid seal, and which can relieve relatively large volumes of gas quickly and smoothly without pulsations. A further object of this invention is to provide a liquid seal which when once blown or ruptured by an increase in gas pressure in the system to which the device is attached, will not reseal as long as the pressure remains above the range of pressures normal for the particular operation being serviced, but will immediately reseal when the pressure falls within the normal operating pressure. Still further objects are to prevent inadvertent loss of gas and the intrusion of air into the system which also could present a very real explosion hazard.

These and other objects are accomplished according to our invention by the use of a gas vent relief device which in its most basic form comprises an inlet conduit carrying gas, the pressure of which is to be controlled, which extends into a housing or tank partially filled with a liquid to a constant level. The inlet conduit is sealed against the flow of gas by the liquid which surrounds the open end of the conduit. The inlet conduit is connected to a cell house main intermediate to the cell house header and compressor. The closed, constant level tank is vented at the top by an outlet conduit which connects with the space in the tank above the level of the liquid. This outlet conduit may convey the gas to the atmosphere or to any point chosen.

A liquid-filled cup or receptacle is positioned below the open end of the inlet conduit and surrounds but does not close off the open end of the submerged inlet conduit. The rim or lip of this cup extends above the surface of the liquid in the housing.

There is provided at least one opening in the rim or lip of the cup positioned below the surface of the liquid, so that the liquid in the cup will seek the level of the surrounding liquid in the tank.

The liquid employed as the seal in the device of the present invention may be any readily available material with an aqueous solution being preferred, and water being especially preferred. However, if desired, any other liquid can be used as long as it does not interfere with the operation of any system which this device services and permits a rapid release of the gas when an upset pressure condition occurs.

A chamber is provided in the housing of the constant level tank which extends above and below the surface of the liquid maintained in the housing. It is open at the bottom and is therefore sealed with the liquid into which it extends and has at least one opening above the surface of said liquid in communication with the inlet gas conduit and at least one opening below the level of the liquid which is in communication with the liquid seal in the rim or lip of the cup or receptacle.

Under normal operating condition, the liquid level in the safety relief device is essentially static with low pressure gas occupying the inlet conduit, there being no gas at the outlet conduit by virtue of the liquid seal at the immersed lower end of the inlet conduit.

If the gas pressure in the inlet conduit becomes upset, the liquid is blown out of the seal permitting an escape of gas via the outlet conduit. Since the rim or lip of the cup is above the level of the surrounding liquid, the seal cannot be reestablished by return flow of the liquid at this point. When the relief device is static, there is a free exchange between the liquid in the seal and the liquid in the aforesaid chamber, but when gas pressure in the inlet conduit is excessive, not only will it blow the seal, but because of the interconnection between the inlet conduit and the chamber by the opening above the liquid surface the increased pressure will also depress the level of the liquid in the open ended chamber, below the level of the submerged opening in the chamber. Therefore, as long as the gas pressure in the inlet conduit is sufficient to blow or rupture the seal, the previously submerged opening connecting the liquid seal and the chamber is now maintained above the level of the liquid under pressure and no reestablishment of the seal is possible unitl the pressure is relieved to a point where the level of the liquid in the chamber seeks the same level as that of the liquid in the housing. When this occurs, the opening between the cup and chamber becomes submerged and the seal is immediately reestablished. As long as the seal exists, no gas can be lost from the system inadvertently, and no air can enter the system provided that any negative pressure which develops does not produce a pressure differential which can over-balance the effective depth of the liquid in the seal. This distance to which the bottom of the inlet conduit is submerged beneath the liquid surface will determine the pressure differential at which the device will vent. For instance, the rupture pressure of the liquid seal may be determined according to the equation:

$$P = LD$$

wherein P is the pressure differential in inches of water. L is the perpendicular distance of the bottom edge of the inlet conduit below the liquid surface; and D is the density of the liquid used as the seal.

For example, when the liquid is water, D is one; hence, the perpendicular distance, L, will equal the pressure in inches of water, at which the liquid seal will blow and provide pressure relief to the system.

The present invention and advantages thereof may be more fully understood by considering the accompanying drawings.

FIG. 1 is a diagrammatic cross-sectional view of the invention in its most basic form; and FIGS. 2–8 are cross-sectional views of alternative embodiments of the gas vent relief device.

Figure 5:
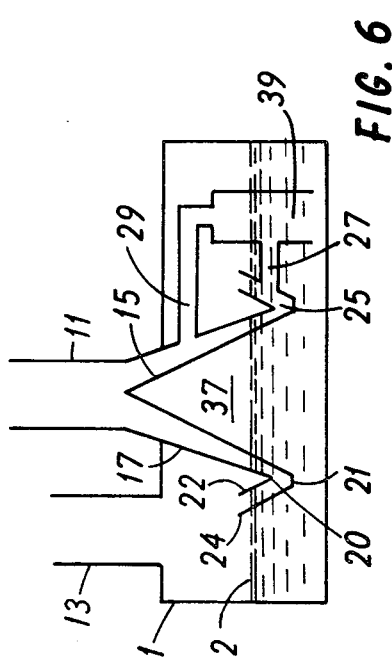

Referring to FIGS. 1–8 which shows a diagrammatic representation of various embodiments of the device just described, inlet conduit 11 is shown as a dip tube and extends into housing 1 which shall be referred to as a constant level tank, and dips into the surface of the liquid, 2, in the tank. The tank is vented only by outlet conduit 13. In the embodiment of FIGS. 1 to 6, chamber 39 is adjacent to, and connected with inlet conduit 11 by means of conduit 29 and with the sealing cup or receptacle 21, by conduit 27 which is immediately beneath the surface of the liquid.

Figure 6:
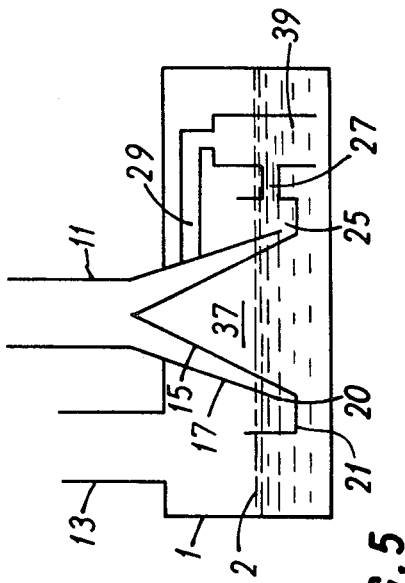
Figure 7:
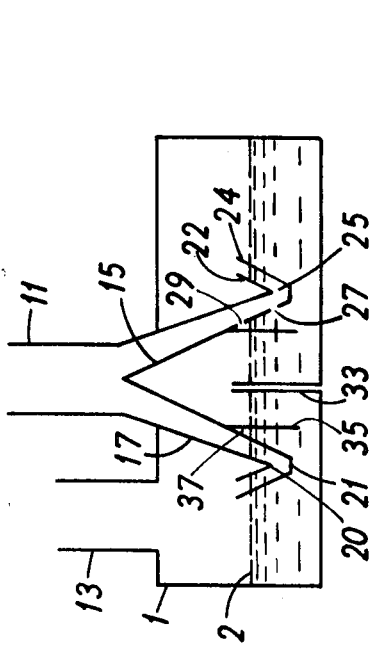
Figure 8:
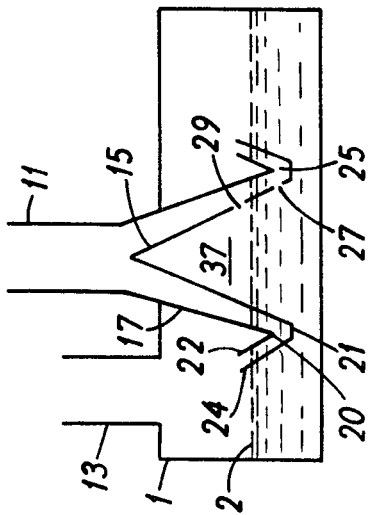

In FIGS. 7 and 8, an embodiment of the device is shown wherein the adjacent chamber 39 as shown in FIGS. 1 to 6 is omitted and chamber 37 becomes an integral part of the seal assembly and performs the same functions in this embodiment as chamber 39 performs in FIGS. 1 to 6.

In normal operation, there is is no flow of gas through the device as it passes from the main cell housing through conduit 4 and 6 (FIG. 1) to the compressor. When the gas pressure in inlet conduit 11 exceeds the normal operating pressure (FIGS. 1–8 and 10), the seal 20 in channel 25 of cup 21 is blown and the liquid is ejected into the surrounding liquid 2 which is maintained at a constant level. The ejection liquid cannot return into channel 25 by the same route, since the upper rim of cup or receptacle 21 extends above liquid surface 2.

Figure 10:
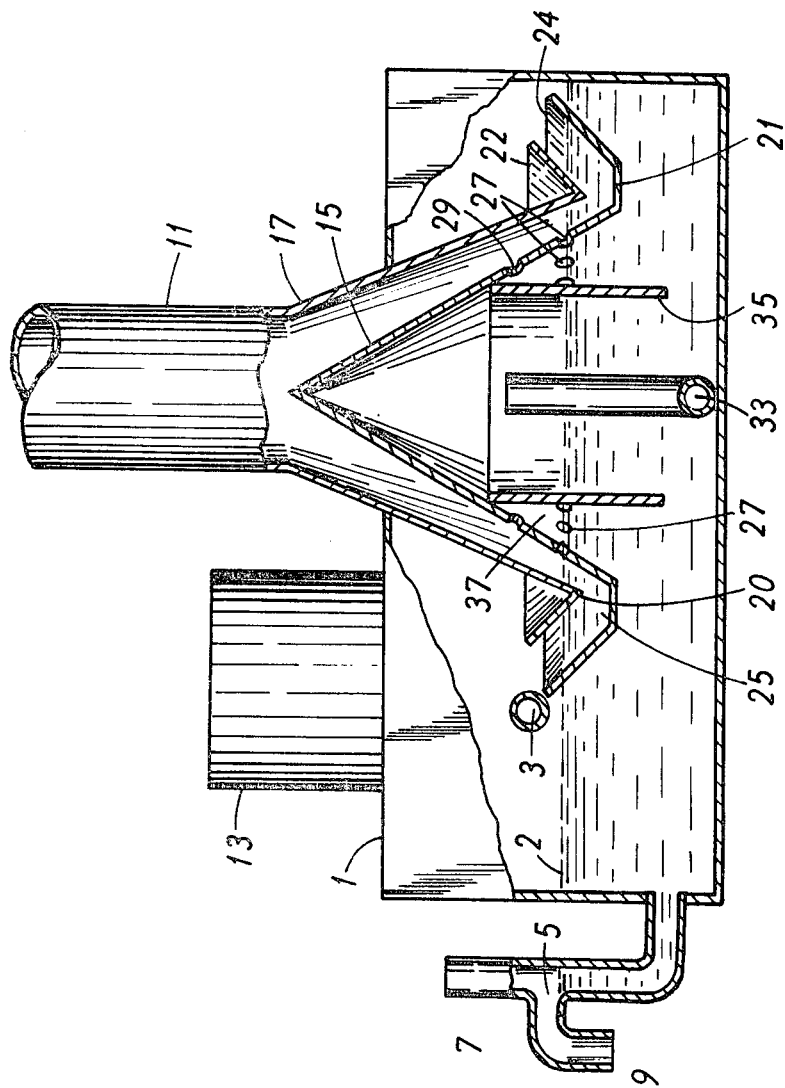
FIG. 10 is a cut-away side view of the preferred embodiment of the present vent device.

Normally, the liquid seal would reform in channel 25 by liquid from chamber 39 (FIGS. 1–6) or 37 (FIGS. 7, 8, and 10) with which it is in communication through submerged conduit 27 (FIGS. 1–6) or submerged ports 27 (FIGS. 7, 8 and 10). When the process is in upset condition, however, and the pressure in conduit 11 to is too high, the pressure depresses the liquid level in chamber 39 (chamber 37 in FIGS. 7, 8 and 10) to a point below conduit 27 (FIGS. 1–6) or opening 27 (FIGS. 7, 8 and 10).

The seal is not reestablished as long as there is excessive pressure in inlet conduit 11 and the gas leaves the system smoothly without any pulsations that would be caused by the gas bubbling through prior-art type liquid seals, or by the intermittent reestablishment of the seal. When the pressure in the system returns to normal, the level of the liquid in chamber 39 (chamber 37 in FIGS. 7, 8 and 10) rises above conduit opening 27 in cup or receptacle 21 and quickly fills channel 25 to restablish) seal 20.

FIG. 2 is an embodiment of the device wherein a frusto-cone, 17, is attached to the bottom of inlet conduit 11 thereby increasing the perimeter of the seal, and consequently the volume of gas that can be handled by the vent device. This embodiment retains the pertinent features of FIG. 1. FIG. 3 represents an embodiment of the present device wherein the bottom end of the frusto-cone 17, which is attached to inlet conduit 11, is additionally flared outwardly and upwardly, so that the rim or flange 22, so formed, extends just above the surface 2 of the liquid in tank 1 This construction slightly reduces the amount of liquid that must be blown from seal 20 to relieve excess pressure in the system to which it is attached, and rim or lip 22 also serves to direct the blown liquid away from the cup or receptacle 21 thus preventing reestablishment of the seal, and decreasing the response time of the device to sudden pressure surges. This embodiment retains the pertinent features of FIG. 2.

FIG. 4, representing another embodiment, is similar to FIG. 1 in all respects but one, namely that the portion of the bottom of the cup or receptacle 21, beneath the end of inlet conduit 11 extends upwardly within the lower end of this conduit to a point above the surface 2 of the liquid in tank 1, to form conical baffle 15. A concentric channel 25 is thereby formed, supplied with liquid from chamber 39 with which it is in communication through submerged conduit 27. The lower end of conduit 11 dips beneath the surface of the liquid in concentric channel 25, thus forming a liquid seal. Since in this embodiment the liquid seal contains much less fluid than the embodiments of 1, 2 and 3, the response time for blowing the seal can be advantageously shortened. This embodiment retains the pertinent features of FIG. 1.

FIG. 5 represents another embodiment of the present device, combining the attached frusto-cone 11 of FIG. 2, with the modified cup or receptacle of FIG. 4, the center of which comprises a conical baffle extending upwardly within the frusto-cone 17 to a point above the surface 2 of the liquid in tank 1. The concentric liquid-filled channel 25 into which the frusto-conical end 17 of the inlet conduit 11 is liquid sealed, has a greater diameter than is the case in the embodiment of FIG. 4. This permits the handling of larger volumes of gas, as with the embodiments of FIGS. 2 and 3, while retaining the advantageously rapid response to pressure surges, characteristic of the embodiment of FIG. 4.

FIG. 6 represents an embodiment of the present device wherein frusto-cone 17 is the same as that shown in FIG. 3, and the outer wall of the cup or receptacle 21 is flared outwardly to become an inverted frusto-cone or flange essentially parallel to rim or flange 22 or frusto-cone 17. The bottom edge 20 of frusto-cone 17 which is coincident with the bottom edge of its lip or rim 22, dips beneath the surface of the liquid in concentric channel 25. This embodiment further reduces the amount of fluid required to seal the vent device without sacrificing its effectiveness and shorten its response time both in regard to the blowing the seal, and its reestablishment. Large volumes of gas can be handled through the large annular space provided. FIG. 7 represents an embodiment of the present device, wherein the adjacent chamber 39 as shown in FIGS. 1 to 6 is eliminated, and chamber 37 which constitutes the space beneath conical baffle 15, becomes an integral part of the seal assembly and performs the same function in this embodiment as chamber 39 performs in FIGS. 1 to 6. Chamber 37 extends both above and below the surface of the liquid, is open at the bottom, and is sealed at the bottom by the liquid. The connection between chamber 37 and cup 21 now can be reduced to at least one opening, 27, and preferably a series of openings or ports placed around the conical baffle 15, immediately below the surface of the sealing liquid as shown in FIGS. 8 and 10. The opening, 29, conveying pressure from inlet conduit 11 to the top of chamber 37, likewise comprises one or more openings in the conical-baffle 15 above the surface of the sealing liquid as shown in FIGS. 8 and 10.

FIG. 8 represents the preferred embodiment wherein the effective volume of chamber 37 is reduced by the positioning therein of cylindrical ring 35 which further increases the sensitivity and rate of response of the relief device to pressure changes within the system to which the device is attached. By placing the open ended cylinder 35 within conical chamber 37, the effective chamber becomes the annular space between the cylinder's outer surfaces and the inner surface of conical baffle 15. The lower edge of the cylinder extends at least as far down as the lowest point in the seal assembly. The opening, or openings, 29, in the wall of the conical baffle 15 are in the upper part of the annular space above the level of the liquid, and the opening, or openings, 27, are in the lower part of the annular space immediately beneath the surface of the liquid. Since a dead air space is produced within the cylindrical ring and the top of the conical baffle into which the cylinder is placed, this space is vented through a tube, 33 (shown in FIGS. 9 and 10), which extends through the wall of the tank 1 to the atmosphere. This embodiment retains the pertinent features of FIG. 7.

Figure 9:
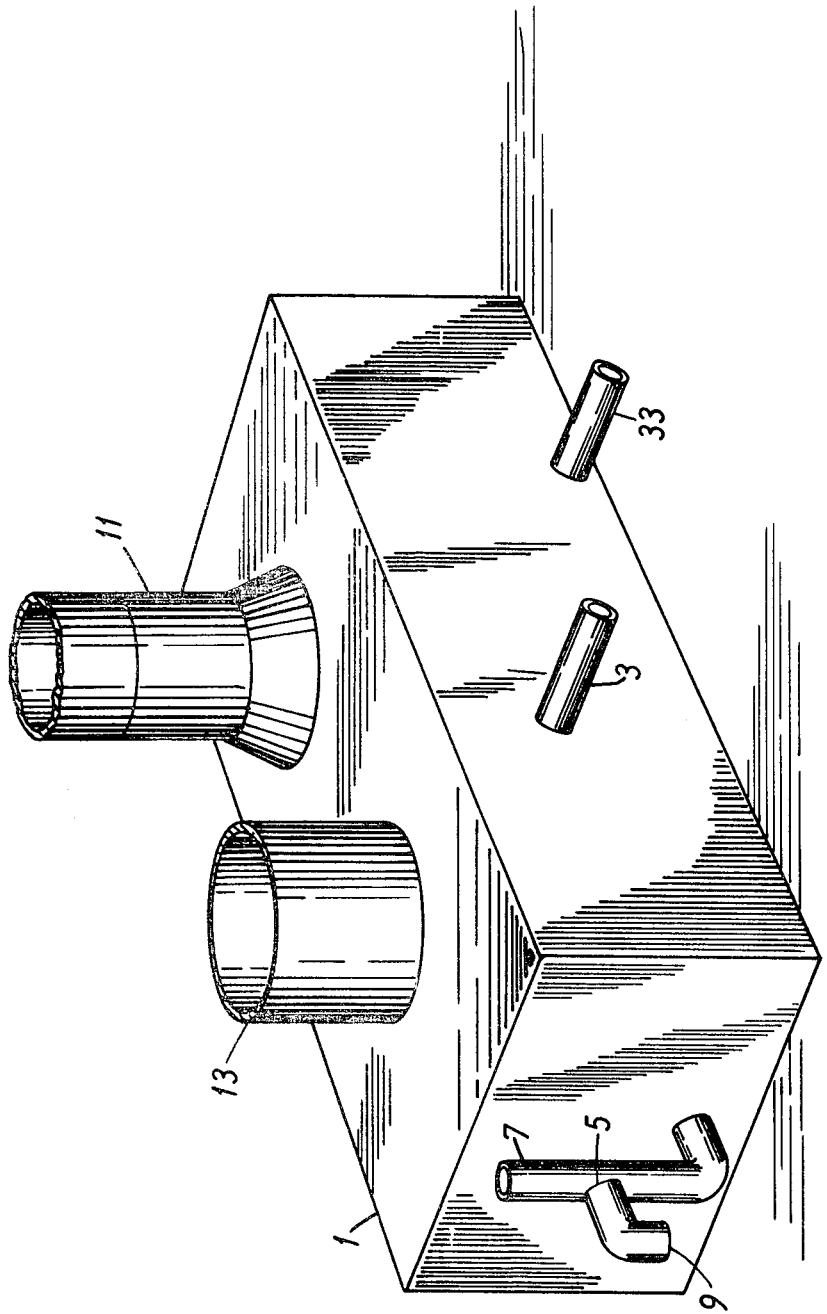
FIG. 9 is an exterior view of the gas vent relief device of the present invention.

For a better understanding of the preferred embodiment of the vent device of the present invention as shown in FIG. 8, reference is made to FIGS. 9 and 10. FIG. 9 is an exterior view of the gas pressure relief device in perspective, showing the external features and their relationship.

FIG. 10 is a side view of the relief device with the obscuring surfaces broken away for a better understanding.

Referring to FIGS. 9 and 10, the gas pressure relief device consists of a constant level tank 1, into which a stream of liquid flows through inlet 3, wells up within the tank to a specific depth predetermined by the height of the side opening 5 in the vented standpipe 7. The liquid overflows leaves through outlet 9. Vertically disposed inlet conduit 11 is attached to a system wherein a source of gas will require venting if the pressure becomes too high for the system. The device will also provide a seal against the flow of air or gas into the system, should the system develop a moderate negative pressure with respect to the pressure within outlet conduit 13.

Referring to FIGS. 1 through 10, conduit 13 conveys the gases to the atmosphere, or to any desired point at which they are released by this vent device, when the pressure in conduit 11 exceeds that in conduit 13 by a preselected amount. Obviously, if the pressure in conduit 13 is not atmospheric, other means, not shown, must be used to maintain a constant liquid level in tank 1. There are many ways in which this level might be maintained. It might, for example, be achieved by adding make-up liquid through an electrically operated valve controlled by a pressure, depth, or weight sensing device, or by a mechanically operated float controlled valve. It might also be achieved by connecting the tank at a point beneath its surface, with a source of the same liquid maintained at a pressure corresponding to the desired depth. Still another approach would be to use an essentially non-volatile liquid, and check the level at intervals by a pressure test of the venting device.

When the pressure in conduit 11 is essentially normal, i.e. below that at which the device is designed to vent, the gas is prevented from venting and is maintained in the system by the liquid seal 20. The sealing structure, as noted above, is defined by the frusto-cone 17 and the conical baffle 15, with channel 25 being the concentric trough formed by conical baffle 15, and its flange 22. The cross section of channel 25 may be angled, or round bottomed, or it may be flat bottomed as shown in the preferred embodiment, FIGS. 8 and 10.

The seal is effected by the bottom edge 20 of frusto-cone 17, which dips beneath the surface of the sealing liquid mantained in concentric channel 25.

Conduit 11 is sealed securely into the top of the constant level tank 1 by welding or by other conventional means, and thereby so positioned that the bottom edge is level, and just below the surface of the liquid level to be maintained in the tank.

In operation, a stream of fluid enters the constant level tank at inlet 3, and overflows through vented standpipe 7 via outlets 5 and 9. Since the standpipe is vented, the liquid seeks its level in the standpipe, and in flowing out through outlet 9, the liquid level in the tank is maintained at the height of the standpipe outlet 5. The liquid enters channel 25 through holes 27 in the wall of the conical baffle 15 filling the trough or channel 25 to the same level as the surrounding liquid in constant level tank 1, forming liquid seal 20.

When the gas pressure in conduit 11 is essentially equal to that at conduit 13, there is no flow of gas in the vent device since the liquid seal 20 is maintained by the bottom edge of frusto-cone 17 dipping into the concentric liquid-filled channel 25. When the gas pressure in conduit 11 exceeds the pressure in conduit 13, the pressure on the surface of the liquid seal 20 in trough 25 blows the liquid out of the channel and into the tank through the annular opening between the cones defined by flanges 22 and 24. It would be expected that the trough would be refilled with the fluid through holes 27 and reform the seal. If this were to occur, the intermittent sealing and unsealing would set up pulsations in the gas pressure in conduit 11 and reverberate into the system to which the vent device is connected. However, since the pressure which blows the liquid seal is also exerted on the liquid in chamber 39 (FIGS. 1 to 6) or chamber 37 (FIGS. 7, 8 and 10) through channel or opening 29, respectively, the surface of the liquid is depressed to a point below conduit 27 (FIGS. 1 to 6) or opening 27 (FIGS. 7, 8 and 10), thereby preventing the reformation of the liquid seal until the pressures in conduits 13 and 11 are again essentially equalized. When the pressure upset in the system is corrected, the level of liquid within chamber 39 or chamber 37 rises above conduit or holes 27, as the case may be, and water again enters the trough, and the liquid seal is restored.

When open ended cylinder 35 (FIGS. 8 and 10) is employed, the effective air space 37 is reduced thereby quickening the response to any pressure differential exerted on the liquid seal. Without the cylinder, the pressure would be exerted on the total gas volume in chamber 37 under the lower conical baffle 15.

The lower cone 15 (FIG. 10) may be held in place by supports, not shown, extending from the inside of the constant level tank 1 or from frusto-cone 17.

The degree of pressure at which this relief device blows its seal 20 may be varied, by varying the height of the liquid outlet 5 in standpipe 7, thus raising or lowering the point of overflow and consequently the level of the liquid 2 in constant level tank 1. When the liquid level 2 in tank 1 has been adjusted downward to the level of the plane of the bottom edge 20 of frusto-cone 17, the point of minimum pressure differential possible, between the intake conduit 11 and the outlet conduit 13, will have been reached. If the liquid level 2 is lowered below the plane of the bottom edge 20 of frusto-cone 17, the liquid seal will be lost. Liquid levels above this plane will progressively increase the pressure required before the seal is blown and relief is thereby obtained, but such adjustments of liquid level must be limited to the vertical distance between the plane of the bottom edge 20 of frusto-cone 17, and the plane of the upper edge of the upturned lip or rim 24 of frusto-cone 17. Liquid levels above this range would permit a return flow of liquid into channel 25 by spilling over rim 24 causing undesirable pulsations and premature resealing at 20.

While the above describes the preferred embodiments of our invention for purposes of illustration, it will be understood that various changes and modifications can be made therein without departing from the spirit and scope of the invention.

I claim:
1. A gas vent relief device which comprises:
   (a) a housing having an inlet conduit and an outlet conduit;
   (b) said housing containing a liquid maintained at a level in said housing to form a gas seal at the open end of the inlet gas conduit extending into said housing to a point below the surface of said liquid;
   (c) said outlet conduit positioned to provide a vent connecting the space in said housing above the surface of the liquid and the exterior of said housing;
   (d) a receptacle located within said housing positioned below and surrounding but not enclosing the open end of said submerged inlet conduit, said receptacle having a rim extending above the surface of the liquid maintained in said housing and at least one opening in said receptacle positioned beneath the surface of the liquid to maintain a liquid seal within said receptacle; and
   (e) an open-ended chamber positioned within said housing, extending above and below the level of said liquid maintained in said housing, and having its open end sealed with said liquid and having at least one opening above the surface of said liquid communicating with said inlet conduit, and at least one opening submerged beneath the surface of said liquid communicating with said opening in said receptacle.

2. The gas vent relief device of claim 1, in that the open end portion of the inlet conduit is a frusto-cone.

3. The device of claim 2 in that the bottom edges of the frusto-cone are flared in an upward direction toward the surface of the liquid and extend above said surface.

4. The device of claim 1, wherein that portion of the receptacle below the open end of the inlet conduit extends upward to a point above the liquid level and within the lower end of the inlet conduit, forming a chamber, open at the bottom and sealed by the liquid maintained in said housing.

5. The device of claim 4 wherein the chamber is formed by an outwardly and downwardly sloping conical baffle the apex of which extends up into the open end of the inlet conduit.

6. The device of claim 5 in that the bottom portion of the conical baffle and the rim portion of the receptacle form a channel in which the liquid seal is maintained.

7. The device of claim 2 wherein that portion of the receptacle below the open end of the inlet conduit extends upward to a point above the liquid level and within the frusto-cone of the inlet conduit to produce a conical baffle, and thus form a chamber, open at the bottom and sealed by the liquid maintained in said housing.

8. The device of claim 3 wherein that portion of the receptacle below the open end of the inlet conduit extends upward to a point above the liquid level and within the frusto-cone of the inlet conduit to produce a conical baffle, and thus form a chamber, open at the bottom and sealed by the liquid maintained in said housing.

9. The device of claim 8 wherein the outer walls of the receptacle which extend upward to a point above the surface of the liquid level, are flared outward to become essentially parallel to the upward flared bottom edge of the frusto-cone.

10. The device of claim 6 in that the baffle has at least one opening above the surface of the liquid maintained in the housing, connecting the chamber and the inlet conduit.

11. The device of claim 10 in that the baffle has at least one opening beneath the surface of the liquid, maintained in the housing, said opening connecting the chamber and the inlet conduit.

12. The device of claim 1 in that the open end of the inlet conduit is a frusto-cone and that portion of the receptacle below the open end of said inlet conduit forms a chamber by an outwardly and downwardly sloping conical baffle, the apex of which extends up into the open end of the inlet conduit, extending to a point above the liquid level and the bottom portion of said chamber being sealed by the liquid maintained in said housing.

13. The device of claim 12 in that the bottom portion of the conical baffle and the upward flared outer wall of the receptacle form a channel into which the lower edge of the frusto-cone dips, to form the gas seal when the liquid is maintained therein.

14. The device of claim 13 in that the frusto-conical baffle has at least one opening connecting the area of the chamber above the surface of the liquid with the inlet conduit and at least one opening connecting the area of chamber below the surface of the liquid with the inlet conduit.

15. The device of claim 14 in that an open ended cylinder is positioned within the chamber, said cylinder extending from beneath the surface of the liquid to a point above the liquid surface to form an annular space between the inner wall of the conical baffle and the chamber formed by the outer wall of the cylinder, said space to extend above all ports which place the chamber in communication with the inlet conduit.

16. A method of releasing gas pressure in a system without introducing pulsations in said gas within said system which comprises providing said system with a gas relief device having a liquid seal which upon rupturing due to an increase in gas pressure within the system dislodges liquid in the liquid seal to permit the gas to exhaust from the system through said device via an inlet conduit and out an outlet conduit, preventing said seal from reestablishing in said device by permitting said excessive pressure to depress the level of a balancing column of liquid positioned below the opening between said column and depleted liquid seal in said device until the pressure differential between the inlet and outlet conduits in said device permits the liquid to flow through said opening and reestablish said liquid seal.

References Cited

UNITED STATES PATENTS

| | | | |
|---|---|---|---|
| 3,237,637 | 3/1966 | Ainsworth | 137—251 |
| 3,459,325 | 7/1969 | Lightner | 137—253 |

HAROLD W. WEAKLEY, Primary Examiner

U.S. Cl. X.R.

137—251